United States Patent
Ahopelto et al.

(10) Patent No.: US 7,702,738 B2
(45) Date of Patent: Apr. 20, 2010

(54) APPARATUS AND METHOD OF SELECTING A RECIPIENT OF A MESSAGE ON THE BASIS OF DATA IDENTIFYING ACCESS TO PREVIOUSLY TRANSMITTED MESSAGES

(75) Inventors: Timo Ahopelto, Helsinki (FI); Donald Peppers, Sea Island, GA (US); Kai Friman, Espoo (FI)

(73) Assignee: CVON Innovations Limited, London (GB)

( * ) Notice: Subject to any disclaimer, the term of this patent is extended or adjusted under 35 U.S.C. 154(b) by 0 days.

(21) Appl. No.: 12/075,862

(22) Filed: Mar. 14, 2008

(65) Prior Publication Data

US 2008/0235341 A1    Sep. 25, 2008

Related U.S. Application Data (63) Continuation of application No. 11/888,446, filed on Aug. 1, 2007, now Pat. No. 7,660,862.

(30) Foreign Application Priority Data

Aug. 9, 2006    (GB) ................................. 0615833.1

(51) Int. Cl.
*G06F 15/16* (2006.01)
(52) U.S. Cl. .................... 709/206; 709/217; 709/227
(58) Field of Classification Search ......... 709/204–207, 709/217, 227
See application file for complete search history.

(56) References Cited

U.S. PATENT DOCUMENTS 5,408,519 A    4/1995    Pierce et al.
5,678,179 A    10/1997    Turcotte et al.

(Continued)

FOREIGN PATENT DOCUMENTS

DE    199 41 461 A1    3/2001

(Continued)

OTHER PUBLICATIONS

Communication Pursuant to Article 94(3) EPC dated Nov. 21, 2008 issued in connection with counterpart European Application No. 08 802 544.2.

(Continued)

*Primary Examiner*—Joseph E Avellino
*Assistant Examiner*—Jackie Zuniga
(74) *Attorney, Agent, or Firm*—Frishauf, Holtz, Goodman & Chick, P.C.; Robert P. Michal (57) ABSTRACT

A method of selecting a recipient of a message on the basis of data identifying access to previously transmitted messages, wherein each said message includes content data for display within a display area of a receiving terminal and control data including data indicative of a user selectable portion within the display area. The method includes receiving content data having one of a plurality of different types for use in creating said message, accessing tracking data corresponding to a previously transmitted message containing content data of a given type, the tracking data being indicative of selection of said user selectable portion upon display thereof at said receiving terminal, and selecting a recipient of the message on the basis of the received content data and the tracking data.

153 Claims, 5 Drawing Sheets

U.S. PATENT DOCUMENTS

| | | | |
|---|---|---|---|
| 5,978,775 | A | 11/1999 | Chen |
| 5,978,833 | A | 11/1999 | Pashley et al. |
| 6,023,700 | A | 2/2000 | Owens et al. |
| 6,097,942 | A | 8/2000 | Laiho |
| 6,202,086 | B1 | 3/2001 | Maruyama et al. |
| 6,345,279 | B1 | 2/2002 | Li et al. |
| 6,647,269 | B2 | 11/2003 | Hendrey et al. |
| 6,889,054 | B2 | 5/2005 | Himmel et al. |
| 7,072,947 | B1 | 7/2006 | Knox et al. |
| 7,155,243 | B2 | 12/2006 | Baldwin et al. |
| 2002/0032602 | A1* | 3/2002 | Lanzillo et al. ............... 705/14 |
| 2002/0077130 | A1 | 6/2002 | Owensby |
| 2002/0128908 | A1* | 9/2002 | Levin et al. .................. 705/14 |
| 2002/0137507 | A1 | 9/2002 | Winkler |
| 2002/0138291 | A1 | 9/2002 | Vaidyanathan et al. |
| 2003/0040297 | A1 | 2/2003 | Pecen et al. |
| 2003/0040300 | A1 | 2/2003 | Bodic et al. |
| 2003/0110171 | A1 | 6/2003 | Ozer et al. |
| 2003/0197719 | A1 | 10/2003 | Lincke et al. |
| 2004/0103157 | A1 | 5/2004 | Requena et al. |
| 2004/0158612 | A1 | 8/2004 | Concannon |
| 2004/0192359 | A1 | 9/2004 | McRaild et al. |
| 2004/0203851 | A1 | 10/2004 | Vetro et al. |
| 2004/0209649 | A1 | 10/2004 | Lord |
| 2004/0254993 | A1* | 12/2004 | Mamas ....................... 709/206 |
| 2004/0254994 | A1 | 12/2004 | Diorio et al. |
| 2004/0259526 | A1 | 12/2004 | Goris et al. |
| 2005/0027676 | A1 | 2/2005 | Eichstaedt et al. |
| 2005/0125397 | A1 | 6/2005 | Gross et al. |
| 2006/0025163 | A1 | 2/2006 | Smith et al. |
| 2006/0031327 | A1 | 2/2006 | Kredo |
| 2006/0041470 | A1 | 2/2006 | Filho et al. |
| 2006/0085395 | A1 | 4/2006 | Cradick et al. |
| 2006/0123014 | A1 | 6/2006 | Ng |
| 2006/0190331 | A1 | 8/2006 | Tollinger et al. |
| 2006/0194595 | A1 | 8/2006 | Myllynen et al. |
| 2006/0200460 | A1 | 9/2006 | Meyerzon et al. |
| 2006/0200461 | A1 | 9/2006 | Lucas et al. |
| 2006/0253327 | A1 | 11/2006 | Morris et al. |
| 2006/0276170 | A1 | 12/2006 | Radhakrishnan et al. |
| 2006/0276213 | A1 | 12/2006 | Gottschalk et al. |
| 2006/0286963 | A1 | 12/2006 | Koskinen et al. |
| 2006/0288124 | A1 | 12/2006 | Kraft et al. |
| 2007/0004380 | A1 | 1/2007 | Ylikoski |
| 2007/0016488 | A1 | 1/2007 | Ulenas |
| 2007/0033104 | A1 | 2/2007 | Collins et al. |
| 2007/0038711 | A1 | 2/2007 | MacBeth et al. |
| 2007/0074262 | A1 | 3/2007 | Kikkoji et al. |
| 2007/0100805 | A1 | 5/2007 | Ramer et al. |
| 2007/0174295 | A1 | 7/2007 | Abraham et al. |
| 2007/0237330 | A1 | 10/2007 | Srivastava |

FOREIGN PATENT DOCUMENTS

| | | | |
|---|---|---|---|
| EP | 1 073 293 | A1 | 1/2001 |
| EP | 1 109 371 | A2 | 6/2001 |
| EP | 1 161 093 | A2 | 12/2001 |
| EP | 1 193 955 | A2 | 4/2002 |
| EP | 1 220 132 | A2 | 7/2002 |
| EP | 1 239 395 | A2 | 9/2002 |
| EP | 1 253 542 | A2 | 10/2002 |
| EP | 1 298 945 | A1 | 4/2003 |
| EP | 1 324 250 | A1 | 7/2003 |
| EP | 1 365 604 | A2 | 11/2003 |
| EP | 1 455 511 | A1 | 9/2004 |
| EP | 1 542 482 | A2 | 6/2005 |
| EP | 1 587 332 | A1 | 10/2005 |
| EP | 1 613 102 | A1 | 1/2006 |
| EP | 1 615 455 | A1 | 1/2006 |
| EP | 1 633 100 | A1 | 3/2006 |
| GB | 2 352 856 | A | 2/2001 |
| GB | 2 356 777 | A | 5/2001 |
| GB | 2 383 149 | A | 6/2003 |
| GB | 2 406 996 | A | 4/2005 |
| GB | 2 407 002 | A | 4/2005 |
| JP | 2002/140272 | | 5/2002 |
| WO | WO 96/24213 | A1 | 8/1996 |
| WO | WO 97/33421 | A1 | 9/1997 |
| WO | WO 98/37685 | | 8/1998 |
| WO | WO 00/44151 | A2 | 7/2000 |
| WO | WO 01/22748 | A1 | 3/2001 |
| WO | WO 01/31497 | A1 | 5/2001 |
| WO | WO 01/55892 | A1 | 8/2001 |
| WO | WO 01/57705 | A1 | 8/2001 |
| WO | WO 01/58178 | A2 | 8/2001 |
| WO | WO 01/65411 | A1 | 9/2001 |
| WO | WO 01/69406 | A1 | 9/2001 |
| WO | WO 01/71949 | A1 | 9/2001 |
| WO | WO 01/72063 | A1 | 9/2001 |
| WO | WO 01/77840 | A1 | 10/2001 |
| WO | WO 01/78425 | A1 | 10/2001 |
| WO | WO 01/91400 | A2 | 11/2001 |
| WO | WO 01/93551 | A2 | 12/2001 |
| WO | WO 01/97539 | A2 | 12/2001 |
| WO | WO 02/31624 | A2 | 4/2002 |
| WO | WO 02/44834 | A2 | 6/2002 |
| WO | WO 02/054803 | A1 | 7/2002 |
| WO | WO 02/059720 | A1 | 8/2002 |
| WO | WO 02/069585 | A2 | 9/2002 |
| WO | WO 02/075574 | A1 | 9/2002 |
| WO | WO 02/080595 | A1 | 10/2002 |
| WO | WO 02/084895 | A1 | 10/2002 |
| WO | WO 03/015430 | A1 | 2/2003 |
| WO | WO 03/019845 | A2 | 3/2003 |
| WO | WO 03/024136 | A1 | 3/2003 |
| WO | WO 03/038638 | A1 | 5/2003 |
| WO | WO 03/088690 | A1 | 10/2003 |
| WO | WO 2004/034671 | A1 | 4/2004 |
| WO | WO 2004/054205 | A1 | 6/2004 |
| WO | WO 2004/084532 | A1 | 9/2004 |
| WO | WO 2004/086791 | A1 | 10/2004 |
| WO | WO 2004/100470 | A1 | 11/2004 |
| WO | WO 2004/100521 | A1 | 11/2004 |
| WO | WO 2004/114109 | A1 | 12/2004 |
| WO | WO 2005/015806 | A2 | 2/2005 |
| WO | WO 2005/029769 | A1 | 3/2005 |
| WO | WO 2005/062637 | A1 | 7/2005 |
| WO | WO 2005/076650 | A1 | 8/2005 |
| WO | WO 2006/002869 | A1 | 1/2006 |
| WO | WO 2006/005001 | A2 | 1/2006 |
| WO | WO 2006/026505 | A2 | 3/2006 |
| WO | WO 2006/027407 | A1 | 3/2006 |
| WO | WO 2006/093284 | A1 | 9/2006 |
| WO | WO 2006/110446 | A1 | 10/2006 |
| WO | WO 2006/119481 | A2 | 11/2006 |
| WO | WO 2007/056698 | A2 | 5/2007 |
| WO | WO 2008/013437 | A1 | 1/2008 |

OTHER PUBLICATIONS

U.K. Search Report under Section 17 dated Nov. 20, 2006 issued in connection with corresponding U.K. Application No. GB 0615833.1.

U.K. Search Report under Section 17 dated Apr. 17, 2007 issued in connection with corresponding U.K. Application No. GB 0705651.8.

International Search Report (Form PCT/ISA/206) issued in connection with corresponding International Application PCT/EP2007/058243.

International Search Report (Form PCT/ISA/210) mailed Feb. 7, 2008 issued in connection with corresponding International Application PCT/EP2007/058243.

Office Action dated Feb. 2, 2009 issued in related U.S. Appl. No. 12/075,853.

Communication Pursuant to Article 94(3) EPC dated Aug. 13, 2009 issued by the European Patent Office in related European Patent Application No. 07 802 544.2 (4 pages).

Office Action from the U.S. Patent and Trademark Office dated Jun. 4, 2009 in related U.S. Appl. No. 11/888,446 (43 pages).

Office Action issued by U.S. Patent Office dated Dec. 23, issued in related U.S. Appl. No. 12/075,853 (9 pages).

Office Action issued from the U.S. Patent and Trademark Office dated Sep. 29, 2009 issued in related U.S. Appl. No. 12/075,853 (10 pages).

PCT Notification of Transmittal of the International Search Report and the Written Opinion of the International Searching Authority, or the Declaration (3 pgs), PCT International Search Report (2 pgs), and PCT Written Opinion of the International Searching Authority (8 pgs) mailed Jun. 19, 2009 on a related foreign PCT application PCT/EP2008/056069 issued by PCT International Searching Authority.

* cited by examiner

APPARATUS AND METHOD OF SELECTING A RECIPIENT OF A MESSAGE ON THE BASIS OF DATA IDENTIFYING ACCESS TO PREVIOUSLY TRANSMITTED MESSAGES

CROSS-REFERENCE TO RELATED APPLICATIONS

This application is a Continuation of application Ser. No. 11/888,446 filed Aug. 1, 2007, now U.S. Pat. No. 7,660,862, which claims priority under 35 USC 119 of GB 0615833.1 filed Aug. 9, 2006, the entire disclosure of each of which is incorporated herein by reference.

FIELD OF THE INVENTION

The present invention relates to a messaging system for creating messages on the basis of actions taken in respect of previously transmitted messages within a communications network, and is particularly, but not exclusively, suited to creating such messages for delivery within a mobile communications network.

BACKGROUND OF THE INVENTION

Currently the Short Message Service (SMS), the Multimedia Messaging Service (MMS) and Wireless Application Protocol (WAP) are the media of choice for personal and service-originated (that is to say information and marketing) mobile messaging. The MMS and WAP services facilitate transmission of messages of unlimited size and virtually any content type within the limitations of mobile terminals, and can be compiled as HTTP messages, which means that they offer a transaction capability with possible super-distribution of content along with accuracy, tracking and feedback of messages. Both messaging types provide a significant improvement—in terms of range and quality of content—over SMS messaging, which is limited to alphanumeric characters.

Telecommunications networks commonly include WAP and Media Gateways, which can track delivery of a WAP and MMS messages to a certain terminal. However, there is no means of identifying what has happened to the message post-delivery: a message can be delivered but deleted before review by the recipient, or forwarded without review by the recipient; in either case current network infrastructure will only be able to track delivery of the message primarily from their gateway elements. This is perhaps not surprising given the responsibility of the network operator, which broadly speaking is limited to the delivery of messages between source and destination addresses. It will be appreciated that influencing a recipient's decision to review a message that has been delivered is quite separate from the mechanics of message transmission, since the latter is dependent on message parameters including sender and content, both of which are often outside of the control of the network operator.

There is therefore a significant difference between delivery of a message and review of the message content, and in view of the fact that subsequent actions taken by the recipient are of interest to the providers of the message content and/or source of the message, there is motivation to develop a means for tracking actions performed in relation to a message subsequent to delivery thereof.

This has been addressed in the field of email messaging, where, as described in U.S. Pat. No. 7,072,947, one solution is to provide an email messaging system arranged to intercept all outgoing emails from a mail server and modify each outgoing email so as to include a tracking code, which is embedded within an image call included in the outgoing email. If the outgoing email contains hyperlinks, each hyperlink is also modified to include the tracking code. The tracking code is uniquely associated with the outgoing email, each individual recipient of the outgoing email (in the case where the outgoing email is addressed to multiple individuals, for example, using the "cc" field of an email), the sender of the outgoing email, or the sender's business association, or a combination thereof. The image call and the embedded tracking code are used to detect when the recipient of the outgoing email has opened an email. The email system associates a cookie with the recipient of the outgoing email, and when the email system receives an image call (i.e. when the recipient has accessed the email), the corresponding image and the cookie are concurrently delivered to the recipient. The cookie is used to monitor the behaviour of the recipient at a website, regardless of how the recipient arrives at that website, be it through a click-through from the email or otherwise.

It will be appreciated that such an arrangement is targeted towards monitoring, in an ongoing sense, user interactions at a given website in the Internet world, and thus that the email message acts as an intermediary to draw traffic to the website containing the information rather than being an end and the primary source of information in itself. It will also be appreciated that because the email provides the means to monitor behaviour at a web site, the process is fairly intensive in terms of usage of network resources when applied to the wireless networks: sending of the email involves one PDP context, the fetching the email from server involves another, pressing the link involves a third context and accessing the third party event server is potentially a fourth context. The number of PDP contexts is the key metric when determining the load on given network elements as well as the technical complexity and infrastructure requirements of such elements for the wireless operators, so it is desirable to minimise the number of contexts involved in message delivery.

SUMMARY OF THE INVENTION

In accordance with a first aspect of the present invention, there is provided a method of selecting a recipient of a message on the basis of data identifying access to previously transmitted messages, each said message comprising content data for display within a display area of a receiving terminal and control data comprising data indicative of a user selectable portion within the display area, the method comprising:

receiving content data having one of a plurality of different types for use in creating a said message;

accessing tracking data corresponding to a previously transmitted message containing content data of a given type, the tracking data being indicative of selection of a said user selectable portion upon display thereof at a said receiving terminal; and selecting a recipient of the message on the basis of the received content data and the tracking data.

Embodiments of the first aspect of the invention thus provide a means of targeting follow-up recipients with content data (such as images, information, presented as text and/or audio), the recipients being known to have previously reviewed and thus become aware of particular types of content. The content data can be characterised by means of various attributes and classified as being of the given, or other, type of content on the basis of the attributes. Alternatively content data can have an identification record associated therewith, identifying its type. This therefore provides a means of categorising content data which is used to match against newly received content data, and thence selection of recipients that have previously reviewed similar content.

According to a second aspect of the present invention there is provided a method of tracking access status of store-and-forward messages transmitted in a communications network, the method comprising:

selecting content for insertion within a store-and-forward message, the content including data for display within a display of a receiving terminal and control data comprising data indicative of a user selectable portion within the display, said display data including data for display in the user selectable portion;

creating a store-and-forward message comprising the selected content for transmission to a receiving terminal;

transmitting the created store-and-forward message to the receiving terminal; and responsive to receipt of data indicative of selection of the user selectable portion within the display, modifying the access status of the transmitted store-and-forward message, wherein the display data and the control data originate from a network location other than a terminal adapted to send messages in the communications network.

Embodiments of the second aspect of the invention thus apply to messages such as WAP, MMS and SMS messages, and operate so as to assemble a message from content and a user selectable portion that have not originated as a message from another terminal.

Embodiments of the various aspects of the invention differ substantially from arrangements such as that described in U.S. Pat. No. 7,072,947 on two levels: firstly in the relationship between the tracking code and the content of the message, and secondly in the way in which tracking data are used and how the system is implemented in wireless data network context. In relation to the first point of distinction, the information that the sender of the message wants the recipient to see is contained within the message itself, rather than being accessible via a link. This means that the tracking data indicate exactly what information has been reviewed as opposed to providing an indication that a particular web page (which might change over time) has been viewed. It is precisely this distinction that enables embodiments of the invention to be realised: future recipients of messages can be selected on the basis of them having already reviewed at least one previously transmitted message containing information of the same, similar, or related in a known manner, type, which has the advantage of enabling advertisers, for example, to target future messages more accurately than is currently possible.

Since the content data are included within the message instead of being accessible via a link, a further advantage of embodiments of the invention is that there is no need for the recipient to wait for various handshake and connectivity actions to be completed before viewing the content data. In addition to this being advantageous from the point of view of the end user, it is also beneficial from the point of view of utilisation of network resources, since fewer network resources (in terms of numbers and duration) are required.

The receiving terminal can operate in one of a plurality of modes in dependence on selection of the user selectable portion; one such mode involves the receiving terminal sending a response message identifying the receiving terminal to the network location, which causes the access status of the message to be updated at the network location.

The control data can comprise a set of processable instructions for use in controlling operation of a receiving terminal in dependence on selection of the user selectable portion: for example, in one arrangement the control data can comprise data that cause the receiving terminal to send the response message to the network location from which the store-and-forward message is transmitted. Alternatively the control data comprise data that cause the receiving terminal to send the response message to a network location other than that from which the store-and-forward message is transmitted.

Once a response message has been received, the method preferably comprises updating the access status of the content data, so as to identify the receiving terminal from which the selection data (in the form of a response message) have emanated.

According to a further aspect of the present invention there is provided a system for performing the aforesaid methods.

The features and advantages described in the dependent claims of the application will become apparent from the following description of preferred embodiments of the invention, given by way of example only, which is made with reference to the accompanying drawings.

DETAILED DESCRIPTION OF THE INVENTION

Embodiments of the invention are concerned with tracking user access to messages, specifically tracking access by capturing an action taken by the user in relation to the message, and using that information to determine content and/or recipients of subsequent messages. The content of the messages being tracked and the nature of the action being taken will be described in detail later in the description, but first a description of the infrastructure needed to support the delivery and tracking of the message will be described.

Figure 1:
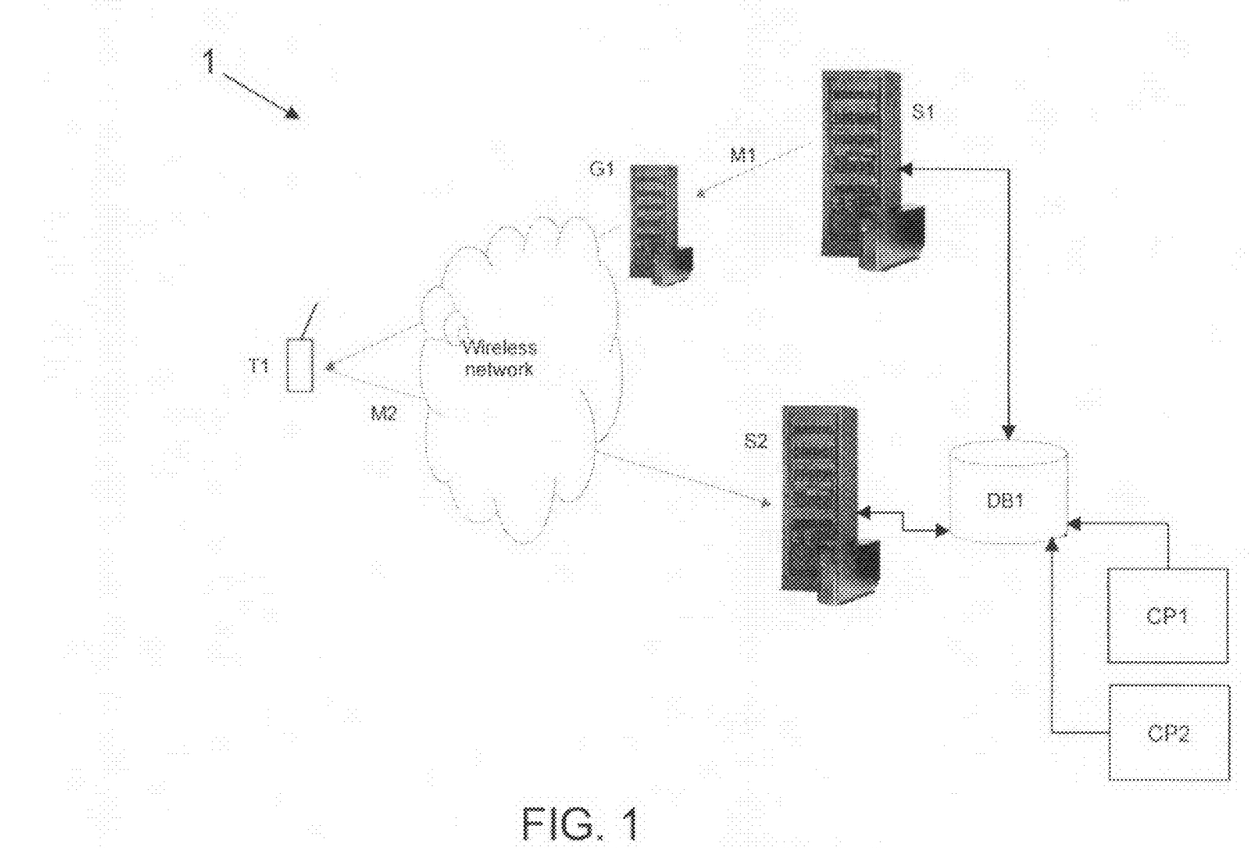
FIG. 1 is a schematic diagram showing a mobile network and network components arranged in accordance with an embodiment of the invention.

FIG. 1 shows an example of a data messaging system 1 within which embodiments of a first aspect of the invention operate; the arrows indicate data flows within the data messaging system 1 and the objects indicate components of the data messaging system 1. This Figure shows an arrangement of network components suitable for the delivery of WAP messages, but the messages could be short messages (SMS), Multimedia messages (MMS messages), bespoke messages in the form of GPRS data and/or streamed data; as will be appreciated, the specific arrangement of the data messaging system 1 is dependent on the type of message being transmitted.

In the arrangement shown in FIG. 1, a terminal MS communicates with various network devices within the data messaging system 1. The terminal T1 may be a wireless terminal such as a mobile phone, a PDA or a Laptop computer. The data messaging system 1 comprises: a WAP gateway G1, which is typically a network operator's WAP gateway; Web and WAP services servers S1, S2; and a database DB1, arranged to store data in respect of subscribers of the data messaging system 1; data in respect of terminals such as T1; and data in respect of content, including image (static, dynamic and/or interactive images), alphanumeric characters and content control information, the data having been provided by various content providers CP1, CP2. The subscriber data include tracking data indicative of actions taken on the part of the subscriber in relation to messages previously transmitted via the data messaging system 1, these messages being identified by the content included therein.

In one arrangement the services servers S1, S2 and the database DB1 are located within a proprietary network, which means that they operate independently of any specific network operator and can be shared across a plurality of network operators. The database DB1 can either be provided by two separate databases or by a single database as shown in FIG. 1, and, while the services servers S1, S2 are shown as two distinct network components, they can alternatively be embodied as one physical device equipped with the functionality corresponding to the respective servers and described below. Using techniques known in the art, the database DB1 can store preference and demographic data relating to subscribers, these data being used to control selection of content as described below.

Figure 2:
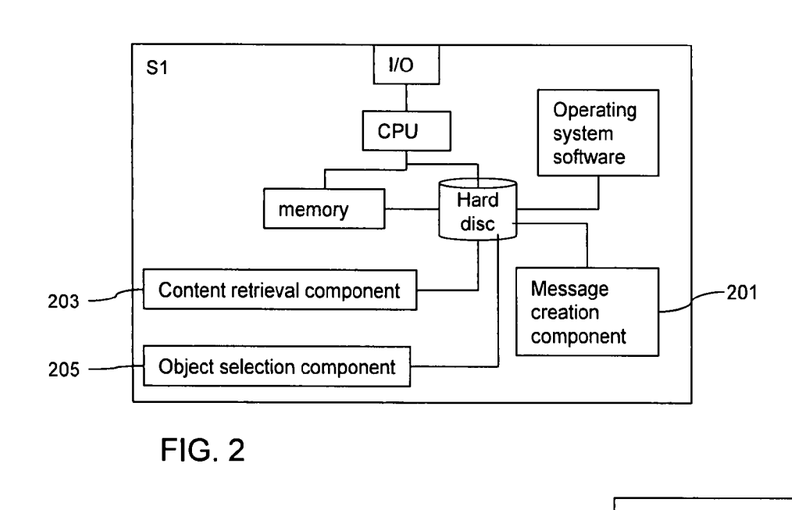
FIG. 2 is a schematic block diagram showing in detail the functionality associated with a first service server shown in FIG. 1.
Figure 3:
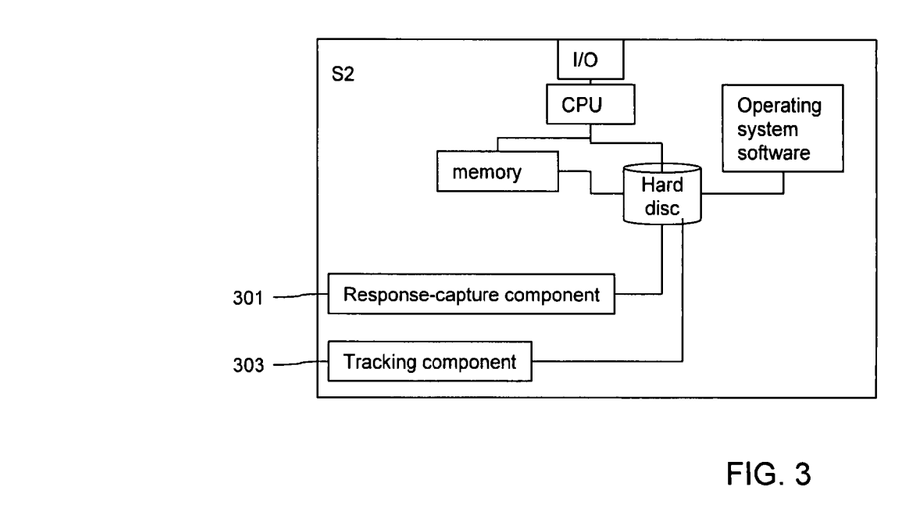
FIG. 3 is a schematic block diagram showing in detail the functionality associated with a second service server shown in FIG. 1.
Figure 4:
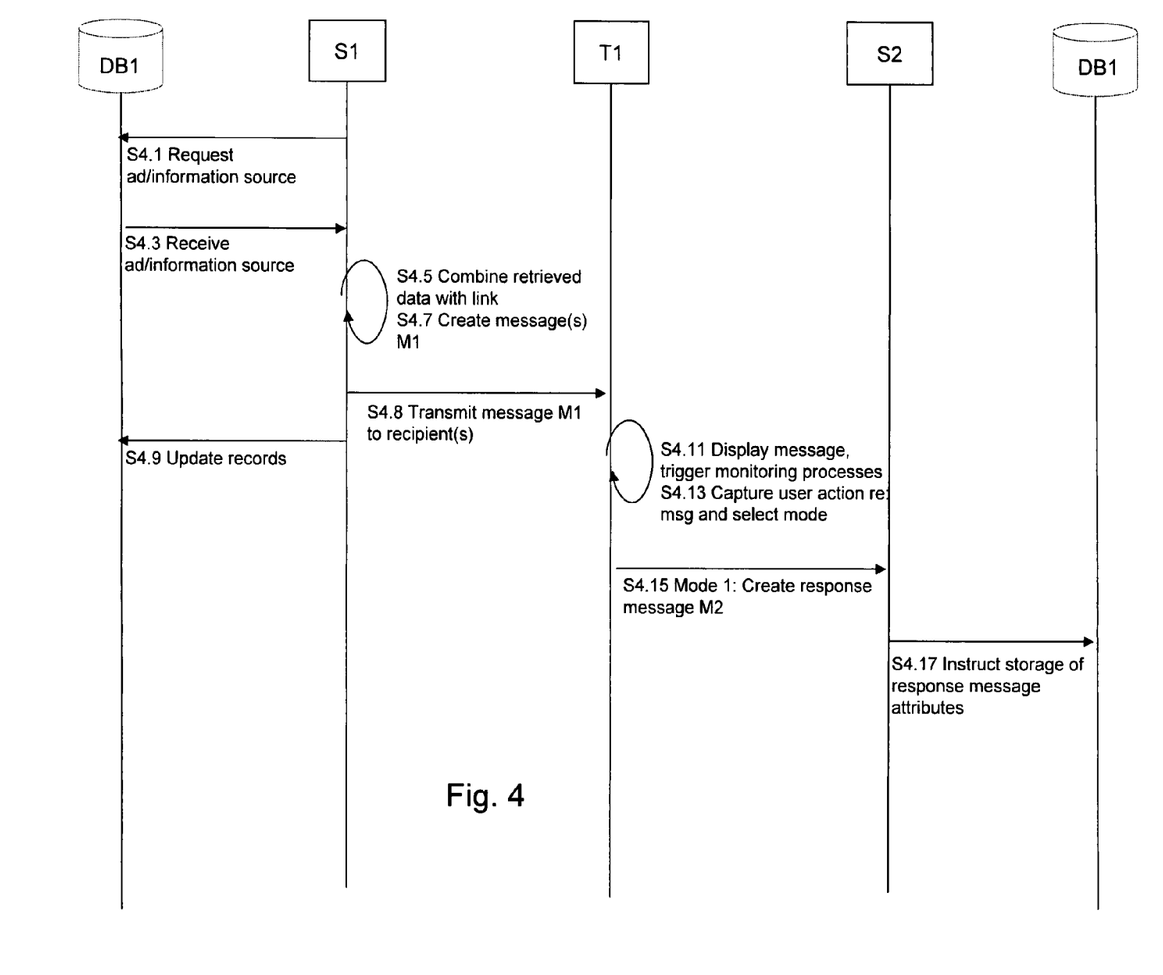
FIG. 4 is a timing diagram showing flow of messages between the network components shown in FIG. 1 according to an embodiment of the invention.

The functionality of the services servers S1, S2 will now be described with reference to FIGS. 2, 3 and 4. In addition to standard CPU, memory, data bus, Input/Output ports, data storage, and operating system programs, the first server S1 comprises certain bespoke functional components, namely message creation software component 201 for creating messages, content retrieval component 203 and object selection component 205, the latter two components 203, 205 being arranged to select data for insertion within the message. The message creation software component 201 triggers message creation based on either recipient or content as a pre-specified starting point. In other words, the message creation component 201 is either arranged to identify one or more message recipients and trigger retrieval of content for those recipients, or to identify content and trigger retrieval of recipients for the content.

In a first embodiment, a group of recipients is specified and content selected on the basis of the recipients. Accordingly, the characteristics of the group are used to define parameters that are used to retrieve the message content. The query can be formulated on the basis of parameters such as type of image, subject matter, date, etc. which have been formulated on the basis of demographic and preference data corresponding to the group of recipients. Once these parameters have been defined the content retrieval software component 203 is triggered to pass a query to the database DB1 (step S4.1), causing the database DB1 to query its records according to the parameters. In one arrangement the database DB1 is configured with filtering and matching functions known in the art for use in identifying records corresponding to the query, and the content identified by these functions is passed to the retrieval software component 203, together with a content identifier ID (step S4.3).

The first services server S1 also includes an object selection software component 205, which is arranged to identify control data specifying one or more user selectable objects for insertion within the message. The object can take the form of a push button or a link (such as a URL), either of which can be overlayed upon the content retrieved by the retrieval software component 203 or presented separate therefrom (e.g. in a different region of the display area of the recipient's terminal). As a further alternative the object selection component 205 can modify a portion of the retrieved content such that, when rendered on a display, the portion is highlighted in some manner (thus in this instance the object causes part of the content to stand out from other parts of the content). The choice of object type can be dependent on type of message being created, since certain types of messages inherently include means for specifying a particular type of object (e.g. HTTP links can be embedded within MMS and WAP messages), while others, such as SMS, do not. Thus, in addition to identifying an object, the control data can include a set of processable instructions, e.g. in the form of a script or the like, which can be processed by a recipient's terminal so as to control rendering of the object and to trigger the recipient's terminal to perform certain actions in response to selection of the object. One such action is for the recipient's terminal to transmit a response message, and the control data include data specifying a network address to which such response messages are to be sent. In one arrangement the network address is that of the second services server S2.

The message creation component 201 is arranged to combine the control data with the content retrieved at step S4.3 so as to create a message body (step S4.5) for each of the recipients. In addition to the control data and retrieved content, the body of these messages includes a content identifier ID, and the body of the message is encapsulated within a message M1 for transmission to each recipient (steps S4.7, S4.8). Once these steps have been completed, the message creation component 201 is arranged to instruct the database DB1 to record the content identifier ID, object type and time of message transmission against each of the recipients (step S4.9).

Once received at a recipient terminal T1, and assuming the message M1 to have been selected by the user for display, the content and object within the message are displayed in accordance with the control data within the message body (step S4.11). In addition, the control data arms the recipient's terminal to monitor for selection of the object, and in response to selection thereof, causes the recipient's terminal to formulate and transmit a response message M2 (step S4.13, S4.15). In its simplest form the body of the response message M2 simply comprises the content identifier ID corresponding to the selected content, and in cases where the object is a URL or similar link, the content identifier ID and network address to which the response messages are to be transmitted can be embedded within the link. Selection of the link triggers formulation of a response message M2 on the basis of data embedded within the link as is known in the art.

Figure 5:
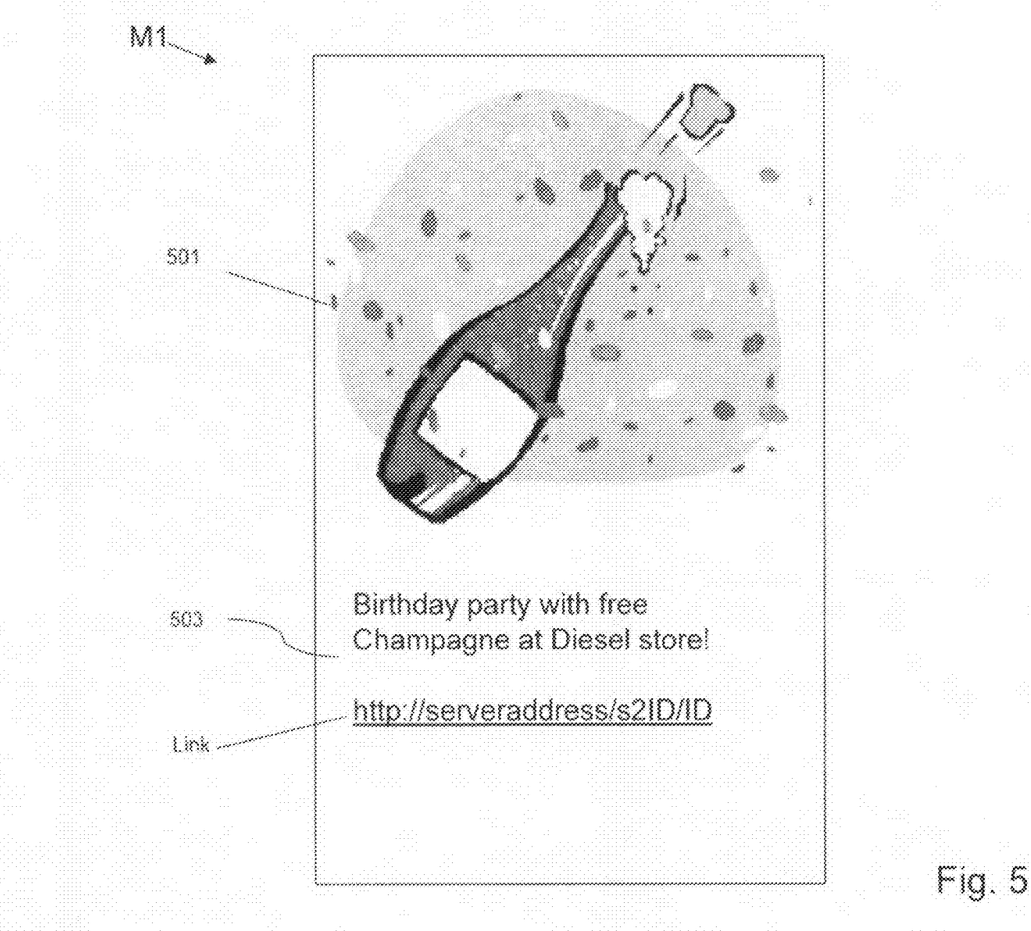
FIG. 5 is schematic diagram showing an example MMS message according to an embodiment of the invention.

When an MMS message includes images and audio portions, such portions are typically embedded within a presentation part of the message, meaning that the content type of the MMS message is application/vnd.wap.multipart.related, thereby identifying the message to comprise several parts. FIG. 5 shows an example MMS message M1 that has been compiled with the Smil™ language having image portion 501 and text portion 503. A suitable presentation part for this message M1 reads as follows:

```
<smil>
  <head>
    <layout>
      <root-layout width="160" height="140"/>
      <region id="Image" width="160" height="120" left="0"
        top="0"/>
      <region id="Text" width="160" height="20" left="0"
        top="120"/>
    </layout>
  </head>
```

-continued

```
<body>
    <img src="Champagne.gif" region="Image" />
    <text src="Birthday party with free Champagne
    at Diesel store!region="Text"/>
    <text src="http://serveraddress/s2ID/ID/region="Text">
</body>
</smil>
```

Instead of displaying the server address, the URL is preferably masked by means of a plain text phrase (e.g. "I will attend"), by means of HTML markup adapted for MMS.

Alternatively, and for example in the case of SMS messages, a "ready-made" response message M2 (with source (recipient) and destination (second services server S2) address and content identifier ID in the message body) can be encapsulated within message M1, which means that the action to be taken on the part of the recipient's terminal in response to selection of the object is simply to extract and transmit the ready-made message M2. In a further arrangement, the set of processable instructions causes the recipient's terminal to retrieve the content identifier ID from message M1 and to create the response message M2 having, as message body, the content identifier ID, and transmit this to the second services server S2. As an alternative to the message body of the response message M2 comprising the content identifier ID, the response message could include the content itself.

The latter two arrangements require the recipient's device to comprise a bespoke software application that can access SMS messages stored in the inbox so as to perform the above-mentioned functions; such an application could be embodied for example as a Symbian Series 60-compatible application or with a mobile operating system with similar capabilities. Alternatively the recipient's terminal could be equipped with a SIM Toolkit that has access to SMS messages stored in the SIM card. A drawback of these arrangements is that the original SMS message would have to include the identifier data, and would thus be displayed to the recipient. However, provided the content of the message is short, the identifier data could, for example, be separated therefrom by means of characters from the ASCII set that enable a clear delineation between message content and control data.

In the foregoing aspect of the invention, the messaging types have been described as store-and-forward messages such as SMS, MMS and WAP—each of which is stored in a network node until such time as delivery is possible to the intended recipient. Thus in comparison to prior art relating to email, such as is described in U.S. Pat. No. 7,072,947, there are only two contexts to be processed: a first context to send the message to the user and a second context when the object is selected. Tracking of access to messages thus involves fewer processing requirements than is required with known systems (from four to two), and incurs a corresponding reduction in network capacity and/or elements required to deliver the messages in a wireless data network or a network containing wireless elements. In addition, when the message M1 is an MMS or WAP message, mobile terminals are not required to be equipped with mobile client applications to benefit from embodiments of the invention, so that content can be sent to a wider range of terminals, and thus recipients.

Turning back to FIG. 3, since the response message M2 has, as its destination address, the second services server S2, any such response message M2 will be delivered thereto. As can be seen from FIG. 3, the second services server S2 includes a response-capture component 301, to which all response messages received by the second server S2 are directed, and a tracking component 303, which evaluates the response messages according to one or more criteria. Upon receipt of a response message, the response-capture component 301 is arranged to identify the terminal from which the response message emanates and to instruct the database DB1 to update a recipient record with data identifying time of receipt of the response message and the content identifier ID (step S4.17). This enables the tracking component 303 to evaluate recipient access to the transmitted message, and thus to the content. In the case where the content comprises advertising material in particular, the message creation component 201 can make use of this information when subsequently creating messages having pre-specified content. In other words, given it is known that certain recipients have reviewed certain types of content, the message creation component 201 can target those recipients with similar advertisements when creating future messages.

Figure 6:
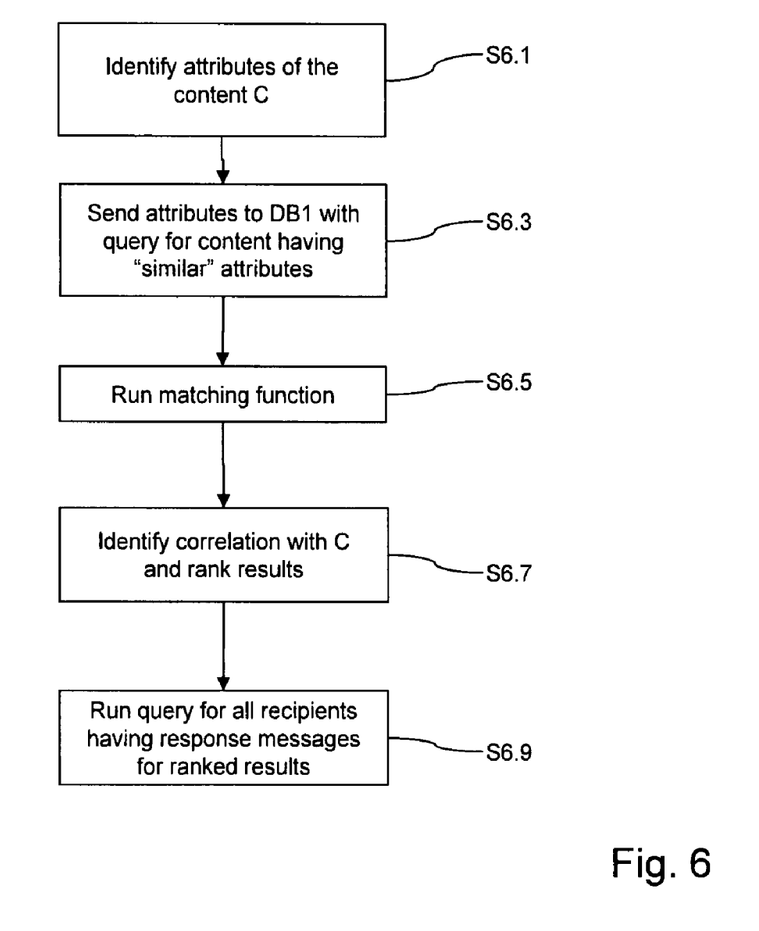
FIG. 6 is a schematic flow diagram showing a process for selecting recipients of a message according to an embodiment of the invention.

A process for performing such selection will now be described with reference to FIG. 6, in which it is assumed that the message creating component 201 has been provided with content C from content provider CP1. At step S6.1, the message creating component 201 identifies attributes of the content C, these typically being specified by the content provider CP1 and accompanying the content C in the form of a content identification record. The message creating component 201 then sends (step S6.3) a query to the database DB1 for previously transmitted content that matches the attributes identified at step S6.1. The database DB1 can invoke a matching algorithm which performs a search for previously transmitted content having all of the specified attributes, content having attributes synonymous with those specified, and content having one, two etc. of the specified attributes (step S6.5). Alternatively, the content identification record accompanying content C can include an identifier of previously provided, and related, content, for use in performing the search.

Content identifiers corresponding to the related and previously transmitted content are ranked in accordance with the correlation between their attributes and those of content C (sent in the query at step S6.3), and a ranked list is transmitted to the message creating component 201 at step S6.7. Once a list of all previously sent "similar" content has been established, the message creating software component 201 sends a query for recipients that have viewed the previously transmitted content for some or all of the content in the ranked list. This causes the database DB1 to retrieve details of all those recipients for which response messages M2 were received (step S6.9) and send the details to the message creating software component 201, for use in formulating messages having content C. It is to be noted that such subsequently transmitted messages can be formulated so as to include or exclude user selectable objects.

This therefore provides a mechanism for targeting follow-up advertisements to recipients that are known to have previously reviewed and thus become aware of particular advertisements.

Additional Details

For WAP type messages, the WAP gateway G1 can transmit data indicative of the messages being delivered to respective terminals, and this can be used to review the response messages, specifically to rank recipients that have transmitted response messages in terms of latency between delivery and review.

Whilst in the above the messaging types have been described as store-and-forward messages such as SMS, MMS and WAP, in relation to the aspect of selecting future recipients for receipt of content, the messaging type could include email messages, where emails are delivered to an email server corresponding to the domain of the recipient, and the email server of the recipient to creates and delivers a copy of the email to the recipient.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for controlling messages being directed to a wireless terminal via a communications network, the method comprising:

providing an application to the terminal to cause the terminal to generate and send an outgoing message after a user of the terminal selects a user selectable object being displayed on the terminal based on a first incoming message, the first incoming message comprising content data for display within a display area of a display on the terminal, control data including data indicative of a user selectable portion within the display area constituting the user selectable object, and response information associated with the user selectable object, the response information including data identifying a network location to which an outgoing message is sent such that the terminal derives the outgoing message from the first incoming message;

monitoring at a server, receipt of outgoing messages sent from the terminal;

storing, in a database associated with the server, data relating to receipt of the outgoing message from the terminal in response to the first incoming message and information about the content data in the first incoming message;

modifying access status of the first incoming message after the server receives the outgoing message derived from the first incoming message to thereby provide an indication of access by the user to the user selectable object associated with the first incoming message; and sending to the terminal, a second incoming message having content data selected based on the information about the content data in the first incoming message and the sending of the outgoing message from the terminal in response to the first incoming message, wherein the first incoming message further includes a content identifier corresponding to the content data, wherein the data stored in the database includes an indication of the sending of the outgoing message in response to the first incoming message in association with the content identifier, and wherein the method further comprises selecting, via a processor, the second incoming message by comparing content data of a potential second incoming message to the content identifier to determine a similarity rank between the content data of the first and second incoming messages.

2. The method of claim 1, further comprising:

maintaining a database of information about receipt of outgoing messages from the terminal; and directing the server to update the database to include a time of receipt of each outgoing message from the terminal in association with a content identifier from the first incoming message.

3. The method of claim 1, further comprising generating the first incoming messages being sent to the terminal to include the server as a destination address.

4. The method of claim 1, further comprising identifying at the server, each terminal from which an outgoing message has been received.

5. The method of claim 1, further comprising formulating via the software application, the outgoing message including the content identifier.

6. The method of claim 5, wherein the step of sending the outgoing message to the network location comprises sending the formulated outgoing message to the network location.

7. The method of claim 1, wherein the user selectable object includes a URL or similar link.

8. The method of claim 7, wherein the content identifier and network location are embedded in the link.

9. The method of claim 8, further comprising extracting, via the software application, the content identifier and network location from the link after selection of the user selectable object by the recipient.

10. The method of claim 9, further comprising formulating via the software application, the outgoing message including the content identifier.

11. The method of claim 1, wherein the network location is embedded in the link.

12. The method of claim 11, further comprising extracting, via the software application, the network location from the link after selection of the user selectable object by the recipient.

13. The method of claim 1, further comprising formulating via the software application, the outgoing message.

14. The method of claim 1, further comprising displaying on a display at the terminal, the content data and user selectable object in accordance with the control data in the first incoming message.

15. The method of claim 1, further comprising formulating via the software application at the terminal, the outgoing message to include at least a portion of the content data.

16. The method of claim 1, further comprising:

displaying on a display at the terminal, the content data; and formulating via the software application at the terminal, the outgoing message including the network location.

17. The method of claim 1, wherein the step of sending the outgoing message comprises sending the outgoing message as one of an SMS, MMS and WAP message.

18. The method of claim 1, further comprising reading at the terminal upon receipt of the first incoming message, the response information for the outgoing message, the response information being encapsulated within the first incoming message.

19. The method of claim 1, wherein the response information includes a response message comprising a content identifier corresponding to the content data and the network location.

20. The method of claim 19, further comprising extracting via the software application, the response message from the first incoming message at the terminal.

21. The method of claim 20, wherein the step of sending the outgoing message comprises sending the extracted response message to the network location.

22. The method of claim 19, wherein the response message comprises data identifying the terminal.

23. The method of claim 1, wherein the step of sending the outgoing message comprises formulating via the software application, the outgoing message to include identification information about the terminal.

24. The method of claim 1, wherein the first incoming message includes image data and the user selectable object is an integral part of the image data.

25. The method of claim 24, further comprising displaying on the display at the terminal, the image data including the user selectable object.

26. The method of claim 1, wherein the step of receiving the first incoming message at a recipient terminal comprises receiving the first incoming message as one of an SMS, MMS and WAP message.

27. The method of claim 1, further comprising:
identifying at least one attribute of a potential second incoming message to be directed to the terminal;
determining whether the first incoming message matches the identified at least one attribute and if so determining whether the outgoing message was sent by the terminal in response to the first incoming message via access to the data stored in the database; and
sending the potential second incoming message to the terminal as the second incoming message only when the first incoming message matches the identified at least one attribute and the outgoing message was sent by the terminal in response to the first incoming message.

28. The method of claim 27, further comprising storing, in the database, indications of which attribute(s) the first incoming message matches, the step of determining whether the first incoming message matches the identified at least one attribute comprising accessing the database.

29. The method of claim 27, further comprising formulating the second incoming message to include control data including data indicative of a user selectable portion within the display area constituting a user selectable object.

30. The method of claim 27, further comprising formulating the second incoming message to exclude control data including data indicative of a user selectable portion within the display area constituting a user selectable object.

31. The method of claim 1, wherein the content data includes an advertisement.

32. A method for controlling messages being directed to a wireless terminal via a communications network, the method comprising:
providing an application to the terminal to cause the terminal to generate and send an outgoing message after a user of the terminal selects a user selectable object being displayed on the terminal based on a first incoming message, the first incoming message comprising content data for display within a display area of a display on the terminal, control data including data indicative of a user selectable portion within the display area constituting the user selectable object, and response information associated with the user selectable object, the response information including data identifying a network location to which an outgoing message is sent such that the terminal derives the outgoing message from the first incoming message;
monitoring at a server, receipt of outgoing messages sent from the terminal;
storing, in a database associated with the server, data relating to receipt of the outgoing message from the terminal in response to the first incoming message and information about the content data in the first incoming message;
modifying access status of the first incoming message after the server receives the outgoing message derived from the first incoming message to thereby provide an indication of access by the user to the user selectable object associated with the first incoming message; and
sending to the terminal, a second incoming message having content data selected based on the information about the content data in the first incoming message and the sending of the outgoing message from the terminal in response to the first incoming message,
wherein the first incoming message further includes a content identifier corresponding to the content data,
wherein the data stored in the database includes an indication of the sending of the outgoing message in response to the first incoming message in association with at least one attribute of the content data, and
wherein the method further comprises selecting, via a processor, the second incoming message by comparing content data of a potential second incoming message to the at least one attribute to determine a similarity rank between the content data of the first and second incoming messages.

33. The method of claim 32, further comprising:
maintaining a database of information about receipt of outgoing messages from the terminal;
directing the server to update the database to include a time of receipt of each outgoing message from the terminal in association with a content identifier from the first incoming message.

34. The method of claim 32, further comprising generating the first incoming messages being sent to the terminal to include the server as a destination address.

35. The method of claim 32, further comprising identifying at the server, each terminal from which an outgoing message has been received.

36. The method of claim 32, further comprising formulating via the software application, the outgoing message including the content identifier.

37. The method of claim 36, wherein the step of sending the outgoing message to the network location comprises sending the formulated outgoing message to the network location.

38. The method of claim 32, wherein the user selectable object includes a URL or similar link.

39. The method of claim 38, wherein the content identifier and network location are embedded in the link.

40. The method of claim 39, further comprising extracting, via the software application, the content identifier and network location from the link after selection of the user selectable object by the recipient.

41. The method of claim 40, further comprising formulating via the software application, the outgoing message including the content identifier.

42. The method of claim 32, wherein the network location is embedded in the link.

43. The method of claim 42, further comprising extracting, via the software application, the network location from the link after selection of the user selectable object by the recipient.

44. The method of claim 32, further comprising formulating via the software application, the outgoing message.

45. The method of claim 32, further comprising displaying on a display at the terminal, the content data and user selectable object in accordance with the control data in the first incoming message.

46. The method of claim 32, further comprising formulating via the software application at the terminal, the outgoing message to include at least a portion of the content data.

47. The method of claim 32, further comprising:
displaying on a display at the terminal, the content data;

and
    formulating via the software application at the terminal, the outgoing message including the network location.

48. The method of claim 32, wherein the step of sending the outgoing message comprises sending the outgoing message as one of an SMS, MMS and WAP message.

49. The method of claim 32, further comprising reading at the terminal upon receipt of the first incoming message, the response information for the outgoing message, the response information being encapsulated within the first incoming message.

50. The method of claim 32, wherein the response information includes a response message comprising a content identifier corresponding to the content data and the network location.

51. The method of claim 50, further comprising extracting via the software application, the response message from the first incoming message at the terminal.

52. The method of claim 51, wherein the step of sending the outgoing message comprises sending the extracted response message to the network location.

53. The method of claim 50, wherein the response message comprises data identifying the terminal.

54. The method of claim 32, wherein the step of sending the outgoing message comprises formulating via the software application, the outgoing message to include identification information about the terminal.

55. The method of claim 32, wherein the first incoming message includes image data and the user selectable object is an integral part of the image data.

56. The method of claim 55, further comprising displaying on the display at the terminal, the image data including the user selectable object.

57. The method of claim 32, wherein the step of receiving the first incoming message at a recipient terminal comprises receiving the first incoming message as one of an SMS, MMS and WAP message.

58. The method of claim 32, further comprising:
    identifying at least one attribute of a potential second incoming message to be directed to the terminal;
    determining whether the first incoming message matches the identified at least one attribute and if so determining whether the outgoing message was sent by the terminal in response to the first incoming message via access to the data stored in the database; and
    sending the potential second incoming message to the terminal as the second incoming message only when the first incoming message matches the identified at least one attribute and the outgoing message was sent by the terminal in response to the first incoming message.

59. The method of claim 58, further comprising storing, in the database, indications of which attribute(s) the first incoming message matches, the step of determining whether the first incoming message matches the identified at least one attribute comprising accessing the database.

60. The method of claim 58, further comprising formulating the second incoming message to include control data including data indicative of a user selectable portion within the display area constituting a user selectable object.

61. The method of claim 58, further comprising formulating the second incoming message to exclude control data including data indicative of a user selectable portion within the display area constituting a user selectable object.

62. The method of claim 32, wherein the content data includes an advertisement.

63. A method for controlling messages being directed to a wireless terminal via a communications network, the method comprising:
    providing an application to the terminal to cause the terminal to generate and send an outgoing message after a user of the terminal selects a user selectable object being displayed on the terminal based on a first incoming message, the first incoming message comprising content data for display within a display area of a display on the terminal, control data including data indicative of a user selectable portion within the display area constituting the user selectable object, and response information associated with the user selectable object, the response information including data identifying a network location to which an outgoing message is sent such that the terminal derives the outgoing message from the first incoming message;
    monitoring at a server, receipt of outgoing messages sent from the terminal;
    storing, in a database associated with the server, data relating to receipt of the outgoing message from the terminal in response to the first incoming message and information about the content data in the first incoming message;
    modifying access status of the first incoming message after the server receives the outgoing message derived from the first incoming message to thereby provide an indication of access by the user to the user selectable object associated with the first incoming message; and
    sending to the terminal, a second incoming message having content data selected based on the information about the content data in the first incoming message and the sending of the outgoing message from the terminal in response to the first incoming message,
    wherein the data stored in the database includes an indication of the sending of the outgoing message in response to the first incoming message in association with at least a portion of the content data, and
    wherein the method further comprises selecting, via a processor, the second incoming message by comparing content data of a potential second incoming message to the content data to determine a similarity rank between the content data of the first and second incoming messages.

64. The method of claim 63, further comprising:
    maintaining a database of information about receipt of outgoing messages from the terminal;
    directing the server to update the database to include a time of receipt of each outgoing message from the terminal in association with a content identifier from the first incoming message.

65. The method of claim 63, further comprising generating the first incoming messages being sent to the terminal to include the server as a destination address.

66. The method of claim 63, further comprising identifying at the server, each terminal from which an outgoing message has been received.

67. The method of claim 63, further comprising formulating via the software application, the outgoing message including the content identifier.

68. The method of claim 67, wherein the step of sending the outgoing message to the network location comprises sending the formulated outgoing message to the network location.

69. The method of claim 63, wherein the user selectable object includes a URL or similar link.

70. The method of claim 69, wherein the content identifier and network location are embedded in the link.

71. The method of claim 70, further comprising extracting, via the software application, the content identifier and network location from the link after selection of the user selectable object by the recipient.

72. The method of claim 71, further comprising formulating via the software application, the outgoing message including the content identifier.

73. The method of claim 63, wherein the network location is embedded in the link.

74. The method of claim 73, further comprising extracting, via the software application, the network location from the link after selection of the user selectable object by the recipient.

75. The method of claim 63, further comprising formulating via the software application, the outgoing message.

76. The method of claim 63, further comprising displaying on a display at the terminal, the content data and user selectable object in accordance with the control data in the first incoming message.

77. The method of claim 63, further comprising formulating via the software application at the terminal, the outgoing message to include at least a portion of the content data.

78. The method of claim 63, further comprising:
displaying on a display at the terminal, the content data; and
formulating via the software application at the terminal, the outgoing message including the network location.

79. The method of claim 63, wherein the step of sending the outgoing message comprises sending the outgoing message as one of an SMS, MMS and WAP message.

80. The method of claim 63, further comprising reading at the terminal upon receipt of the first incoming message, the response information for the outgoing message, the response information being encapsulated within the first incoming message.

81. The method of claim 63, wherein the response information includes a response message comprising a content identifier corresponding to the content data and the network location.

82. The method of claim 81, further comprising extracting via the software application, the response message from the first incoming message at the terminal.

83. The method of claim 82, wherein the step of sending the outgoing message comprises sending the extracted response message to the network location.

84. The method of claim 81, wherein the response message comprises data identifying the terminal.

85. The method of claim 63, wherein the step of sending the outgoing message comprises formulating via the software application, the outgoing message to include identification information about the terminal.

86. The method of claim 63, wherein the first incoming message includes image data and the user selectable object is an integral part of the image data.

87. The method of claim 86, further comprising displaying on the display at the terminal, the image data including the user selectable object.

88. The method of claim 63, wherein the step of receiving the first incoming message at a recipient terminal comprises receiving the first incoming message as one of an SMS, MMS and WAP message.

89. The method of claim 63, further comprising:
identifying at least one attribute of a potential second incoming message to be directed to the terminal;
determining whether the first incoming message matches the identified at least one attribute and if so determining whether the outgoing message was sent by the terminal in response to the first incoming message via access to the data stored in the database; and
sending the potential second incoming message to the terminal as the second incoming message only when the first incoming message matches the identified at least one attribute and the outgoing message was sent by the terminal in response to the first incoming message.

90. The method of claim 89, further comprising storing, in the database, indications of which attribute(s) the first incoming message matches, the step of determining whether the first incoming message matches the identified at least one attribute comprising accessing the database.

91. The method of claim 89, further comprising formulating the second incoming message to include control data including data indicative of a user selectable portion within the display area constituting a user selectable object.

92. The method of claim 89, further comprising formulating the second incoming message to exclude control data including data indicative of a user selectable portion within the display area constituting a user selectable object.

93. The method of claim 63, wherein the content data includes an advertisement.

94. The method of claim 63, wherein the first incoming message further includes a content identifier corresponding to the content data.

95. A method for controlling messages being directed to a wireless terminal via a communications network, the method comprising:
providing an application to the terminal to cause the terminal to generate and send an outgoing message after a user of the terminal selects a user selectable object being displayed on the terminal based on a first incoming message, the first incoming message comprising content data for display within a display area of a display on the terminal, control data including data indicative of a user selectable portion within the display area constituting the user selectable object, and response information associated with the user selectable object, the response information including data identifying a network location to which an outgoing message is sent such that the terminal derives the outgoing message from the first incoming message;
monitoring at a server, receipt of outgoing messages sent from the terminal;
storing, in a database associated with the server, data relating to receipt of the outgoing message from the terminal in response to the first incoming message and information about the content data in the first incoming message;
modifying access status of the first incoming message after the server receives the outgoing message derived from the first incoming message to thereby provide an indication of access by the user to the user selectable object associated with the first incoming message; and
sending to the terminal, a second incoming message having content data selected based on the information about the content data in the first incoming message and the sending of the outgoing message from the terminal in response to the first incoming message,
wherein the data stored in the database includes an indication of the sending of the outgoing message in response to the first incoming message in association with at least one attribute of the content data, and
wherein the method further comprises selecting, via a processor, the second incoming message by comparing content data of a potential second incoming message to the at least one attribute to determine a similarity rank between the content data of the first and second incoming messages.

96. The method of claim 63, further comprising:
maintaining a database of information about receipt of outgoing messages from the terminal;
directing the server to update the database to include a time of receipt of each outgoing message from the terminal in association with a content identifier from the first incoming message.

97. The method of claim 95, further comprising generating the first incoming messages being sent to the terminal to include the server as a destination address.

98. The method of claim 95, further comprising identifying at the server, each terminal from which an outgoing message has been received.

99. The method of claim 95, further comprising formulating via the software application, the outgoing message including the content identifier.

100. The method of claim 99, wherein the step of sending the outgoing message to the network location comprises sending the formulated outgoing message to the network location.

101. The method of claim 95, wherein the user selectable object includes a URL or similar link.

102. The method of claim 101, wherein the content identifier and network location are embedded in the link.

103. The method of claim 102, further comprising extracting, via the software application, the content identifier and network location from the link after selection of the user selectable object by the recipient.

104. The method of claim 103, further comprising formulating via the software application, the outgoing message including the content identifier.

105. The method of claim 95, wherein the network location is embedded in the link.

106. The method of claim 105, further comprising extracting, via the software application, the network location from the link after selection of the user selectable object by the recipient.

107. The method of claim 95, further comprising formulating via the software application, the outgoing message.

108. The method of claim 95, further comprising displaying on a display at the terminal, the content data and user selectable object in accordance with the control data in the first incoming message.

109. The method of claim 95, further comprising formulating via the software application at the terminal, the outgoing message to include at least a portion of the content data.

110. The method of claim 95, further comprising:
displaying on a display at the terminal, the content data; and
formulating via the software application at the terminal, the outgoing message including the network location.

111. The method of claim 95, wherein the step of sending the outgoing message comprises sending the outgoing message as one of an SMS, MMS and WAP message.

112. The method of claim 95, further comprising reading at the terminal upon receipt of the first incoming message, the response information for the outgoing message, the response information being encapsulated within the first incoming message.

113. The method of claim 95, wherein the response information includes a response message comprising a content identifier corresponding to the content data and the network location.

114. The method of claim 113, further comprising extracting via the software application, the response message from the first incoming message at the terminal.

115. The method of claim 114, wherein the step of sending the outgoing message comprises sending the extracted response message to the network location.

116. The method of claim 113, wherein the response message comprises data identifying the terminal.

117. The method of claim 95, wherein the step of sending the outgoing message comprises formulating via the software application, the outgoing message to include identification information about the terminal.

118. The method of claim 95, wherein the first incoming message includes image data and the user selectable object is an integral part of the image data.

119. The method of claim 118, further comprising displaying on the display at the terminal, the image data including the user selectable object.

120. The method of claim 95, wherein the step of receiving the first incoming message at a recipient terminal comprises receiving the first incoming message as one of an SMS, MMS and WAP message.

121. The method of claim 95, further comprising:
identifying at least one attribute of a potential second incoming message to be directed to the terminal;
determining whether the first incoming message matches the identified at least one attribute and if so determining whether the outgoing message was sent by the terminal in response to the first incoming message via access to the data stored in the database; and
sending the potential second incoming message to the terminal as the second incoming message only when the first incoming message matches the identified at least one attribute and the outgoing message was sent by the terminal in response to the first incoming message.

122. The method of claim 121, further comprising storing, in the database, indications of which attribute(s) the first incoming message matches, the step of determining whether the first incoming message matches the identified at least one attribute comprising accessing the database.

123. The method of claim 121, further comprising formulating the second incoming message to include control data including data indicative of a user selectable portion within the display area constituting a user selectable object.

124. The method of claim 121, further comprising formulating the second incoming message to exclude control data including data indicative of a user selectable portion within the display area constituting a user selectable object.

125. The method of claim 95, wherein the content data includes an advertisement.

126. The method of claim 95, wherein the first incoming message further includes a content identifier corresponding to the content data.

127. A server system that controls messages being directed to a wireless terminal via a communications network, the terminal including an application that causes generation and sending of an outgoing message after a user of the terminal selects a user selectable object being displayed on the terminal based on a first incoming message, the first incoming message comprising content data for display within a display area of a display on the terminal, control data including data indicative of a user selectable portion within the display area constituting the user selectable object, and response information associated with the user selectable object, the response information including data identifying a network location to which an outgoing message is sent such that the terminal derives the outgoing message from the first incoming message, the server system comprising:
- a response-capture component that receives outgoing messages sent from the terminal;
- a tracking component that evaluates each outgoing message after the response-capture component receives the outgoing message to thereby provide an indication of access by the user to the user selectable object associated with the first incoming message;
- a database that stores data relating to receipt of the outgoing message from the terminal in response to access by the user to the user selectable object associated with the first incoming message and information about the content data in the first incoming message; and
- a message creating component that selects a second incoming message to be directed to the terminal based on the information about the content data in the first incoming message and the sending of the outgoing message from the terminal in response to the first incoming message,
- wherein the data stored in the database includes an indication of the sending of the outgoing message in response to the first incoming message in association with at least one attribute of the content data, and
- wherein the message creating component is arranged to select the second incoming message by comparing content data of a potential second incoming message to the at least one attribute to determine a similarity rank between the content data of the first and second incoming messages.

128. The server system of claim 127, wherein the response-capture component is arranged to update the database to include a time of receipt of each outgoing message from the terminal in association with a content identifier from the first incoming message.

129. The server system of claim 127, wherein the response-capture component is arranged to update the database to include a time of receipt of each outgoing message from the terminal.

130. The server system of claim 127, wherein the response-capture component is arranged to identify each terminal from which an outgoing message has been received.

131. The server system of claim 127, wherein the message creating component is arranged to identify at least one attribute of a potential second incoming message to be directed to the terminal, determine whether the first incoming message matches the identified at least one attribute and if so determine whether the outgoing message was sent by the terminal in response to the first incoming message via access to the data stored in the database, and send the potential second incoming message to the terminal as the second incoming message only when the first incoming message matches the identified at least one attribute and the outgoing message was sent by the terminal in response to the first incoming message.

132. The server system of claim 131, wherein the database stores indications of which attribute(s) the first incoming message matches, the message creating component being arranged to determine whether the first incoming message matches the identified at least one attribute by accessing the database.

133. The server system of claim 131, wherein the message creating component is arranged to formulate the second incoming message to include control data including data indicative of a user selectable portion within the display area constituting a user selectable object.

134. The server system of claim 131, wherein the message creating component is arranged to formulate the second incoming message to exclude control data including data indicative of a user selectable portion within the display area constituting a user selectable object.

135. The server system of claim 127, wherein the message creating component is resident on a first server and the response-capture component and tracking component are resident on a second server.

136. A server system that controls messages being directed to a wireless terminal via a communications network, the terminal including an application that causes generation and sending of an outgoing message after a user of the terminal selects a user selectable object being displayed on the terminal based on a first incoming message, the first incoming message comprising content data for display within a display area of a display on the terminal, control data including data indicative of a user selectable portion within the display area constituting the user selectable object, and response information associated with the user selectable object, the response information including data identifying a network location to which an outgoing message is sent such that the terminal derives the outgoing message from the first incoming message, the server system comprising:
- a response-capture component that receives outgoing messages sent from the terminal;
- a tracking component that evaluates each outgoing message after the response-capture component receives the outgoing message to thereby provide an indication of access by the user to the user selectable object associated with the first incoming message;
- a database that stores data relating to receipt of the outgoing message from the terminal in response to access by the user to the user selectable object associated with the first incoming message and information about the content data in the first incoming message; and
- a message creating component that selects a second incoming message to be directed to the terminal based on the information about the content data in the first incoming message and the sending of the outgoing message from the terminal in response to the first incoming message,
- wherein the first incoming message further includes a content identifier corresponding to the content data, and the data stored in the database includes an indication of the sending of the outgoing message in response to the first incoming message in association with the content identifier, and
- wherein the message creating component is arranged to select the second incoming message by comparing content data of a potential second incoming message to the content identifier to determine a similarity rank between the content data of the first and second incoming messages.

137. The server system of claim 136, wherein the response-capture component is arranged to update the database to include a time of receipt of each outgoing message from the terminal in association with a content identifier from the first incoming message.

138. The server system of claim 136, wherein the response-capture component is arranged to update the database to include a time of receipt of each outgoing message from the terminal.

139. The server system of claim 136, wherein the response-capture component is arranged to identify each terminal from which an outgoing message has been received.

140. The server system of claim 136, wherein the message creating component is arranged to identify at least one attribute of a potential second incoming message to be directed to the terminal, determine whether the first incoming message matches the identified at least one attribute and if so determine whether the outgoing message was sent by the terminal in response to the first incoming message via access to the data stored in the database, and send the potential second incoming message to the terminal as the second incoming message only when the first incoming message matches the identified at least one attribute and the outgoing message was sent by the terminal in response to the first incoming message.

141. The server system of claim 140, wherein the database stores indications of which attribute(s) the first incoming message matches, the message creating component being arranged to determine whether the first incoming message matches the identified at least one attribute by accessing the database.

142. The server system of claim 140, wherein the message creating component is arranged to formulate the second incoming message to include control data including data indicative of a user selectable portion within the display area constituting a user selectable object.

143. The server system of claim 140, wherein the message creating component is arranged to formulate the second incoming message to exclude control data including data indicative of a user selectable portion within the display area constituting a user selectable object.

144. The server system of claim 136, wherein the message creating component is resident on a first server and the response-capture component and tracking component: are resident on a second server.

145. A server system that controls messages being directed to a wireless terminal via a communications network, the terminal including an application that causes generation and sending of an outgoing message after a user of the terminal selects a user selectable object being displayed on the terminal based on a first incoming message, the first incoming message comprising content data for display within a display area of a display on the terminal, control data including data indicative of a user selectable portion within the display area constituting the user selectable object, and response information associated with the user selectable object, the response information including data identifying a network location to which an outgoing message is sent such that the terminal derives the outgoing message from the first incoming message, the server system comprising:
 a response-capture component that receives outgoing messages sent from the terminal;
 a tracking component that evaluates each outgoing message after the response-capture component receives the outgoing message to thereby provide an indication of access by the user to the user selectable object associated with the first incoming message;
 a database that stores data relating to receipt of the outgoing message from the terminal in response to access by the user to the user selectable object associated with the first incoming message and information about the content data in the first incoming message; and
 a message creating component that selects a second incoming message to be directed to the terminal based on the information about the content data in the first incoming message and the sending of the outgoing message from the terminal in response to the first incoming message;
 wherein the data stored in the database includes an indication of the sending of the outgoing message in response to the first incoming message in association with at least a portion of the content data; and
 wherein the message creating component is arranged to select the second incoming message by comparing content data of a potential second incoming message to the content data to determine a similarity rank between the content data of the first and second incoming messages.

146. The server system of claim 145, wherein the response-capture component is arranged to update the database to include a time of receipt of each outgoing message from the terminal in association with a content identifier from the first incoming message.

147. The server system of claim 145, wherein the response-capture component is arranged to update the database to include a time of receipt of each outgoing message from the terminal.

148. The server system of claim 145, wherein the response-capture component is arranged to identify each terminal from which an outgoing message has been received.

149. The server system of claim 145, wherein the message creating component is arranged to identify at least one attribute of a potential second incoming message to be directed to the terminal, determine whether the first incoming message matches the identified at least one attribute and if so determine whether the outgoing message was sent by the terminal in response to the first incoming message via access to the data stored in the database, and send the potential second incoming message to the terminal as the second incoming message only when the first incoming message matches the identified at least one attribute and the outgoing message was sent by the terminal in response to the first incoming message.

150. The server system of claim 149, wherein the database stores indications of which attribute(s) the first incoming message matches, the message creating component being arranged to determine whether the first incoming message matches the identified at least one attribute by accessing the database.

151. The server system of claim 149, wherein the message creating component is arranged to formulate the second incoming message to include control data including data indicative of a user selectable portion within the display area constituting a user selectable object.

152. The server system of claim 149, wherein the message creating component is arranged to formulate the second incoming message to exclude control data including data indicative of a user selectable portion within the display area constituting a user selectable object.

153. The server system of claim 145, wherein the message creating component is resident on a first server and the response-capture component and tracking component are resident on a second server.

* * * * *